(12) United States Patent
Mathon et al.

(10) Patent No.: US 9,889,611 B2
(45) Date of Patent: Feb. 13, 2018

(54) DEVICE FOR HOLDING A FIBER TEXTURE ON AN IMPREGNATION MANDREL OF A WINDING MACHINE

(71) Applicant: SNECMA, Paris (FR)

(72) Inventors: Richard Mathon, Brunoy (FR); Olivier Patrigeon, Nanterre (FR); Micah Gummel, East Kingston, NH (US)

(73) Assignee: SNECMA, Paris (FR)

( * ) Notice: Subject to any disclaimer, the term of this patent is extended or adjusted under 35 U.S.C. 154(b) by 669 days.

(21) Appl. No.: 14/351,987

(22) PCT Filed: Oct. 23, 2012

(86) PCT No.: PCT/FR2012/052423
§ 371 (c)(1),
(2) Date: Apr. 15, 2014

(87) PCT Pub. No.: WO2013/060978
PCT Pub. Date: May 2, 2013

(65) Prior Publication Data
US 2014/0302186 A1    Oct. 9, 2014

(30) Foreign Application Priority Data
Oct. 26, 2011    (FR) ...................... 11 59713

(51) Int. Cl.
*B29C 70/32*    (2006.01)
*B29C 70/54*    (2006.01)
(Continued)

(52) U.S. Cl.
CPC ............ *B29C 70/32* (2013.01); *B29C 53/562* (2013.01); *B29C 53/8016* (2013.01);
(Continued)

(58) Field of Classification Search
CPC ... B29C 70/32; B29C 70/543; B29C 53/8016; B29C 53/562; B29C 2053/8025; B29L 2031/7504
(Continued)

(56) References Cited

U.S. PATENT DOCUMENTS 4,388,263 A    6/1983   Prunty
5,597,435 A    6/1997   Desautels et al.
(Continued)

FOREIGN PATENT DOCUMENTS

JP    9-226011 A    9/1997

OTHER PUBLICATIONS

International Search Report dated Jan. 22, 2013 in PCT/FR12/052423 Filed Oct. 23, 2012.

*Primary Examiner* — Seyed Masoud Malekzadeh
(74) *Attorney, Agent, or Firm* — Oblon, McClelland, Maier & Neustadt, L.L.P.

(57) ABSTRACT

A device for holding a fiber texture on an impregnation mandrel of a winding machine, the device including a cross-member forming a support having each of its ends for fastening on one of cheekplates of the mandrel, a central pad carrier mounted on the cross-member and including a pad for pressing against a fiber texture layer wound on the mandrel, two lateral pad carriers mounted on the cross-member and each including a main pad for pressing against the fiber texture layer wound on the mandrel and a lateral pad for pressing against a lateral margin of the fiber texture layer wound on the mandrel, and a mechanism exerting a clamping force urging the pads against the fiber texture layer wound on the mandrel.

4 Claims, 4 Drawing Sheets

(51) Int. Cl.
 *B29C 53/56* (2006.01)
 *B29C 53/80* (2006.01)
 *B29L 31/00* (2006.01)

(52) U.S. Cl.
 CPC .... *B29C 70/543* (2013.01); *B29C 2053/8025* (2013.01); *B29L 2031/7504* (2013.01)

(58) Field of Classification Search
 USPC .......................................................... 425/112
 See application file for complete search history.

(56) References Cited

U.S. PATENT DOCUMENTS

| | | | | |
|---|---|---|---|---|
| 2007/0272346 | A1* | 11/2007 | Shpik ................... | B29C 53/566 156/171 |
| 2008/0093026 | A1* | 4/2008 | Naumann ............. | B29C 70/386 156/378 |
| 2008/0169579 | A1* | 7/2008 | Mueller-Hummel . | B29C 70/386 264/40.1 |
| 2010/0024971 | A1* | 2/2010 | Benson ................. | B29C 70/32 156/245 |

* cited by examiner

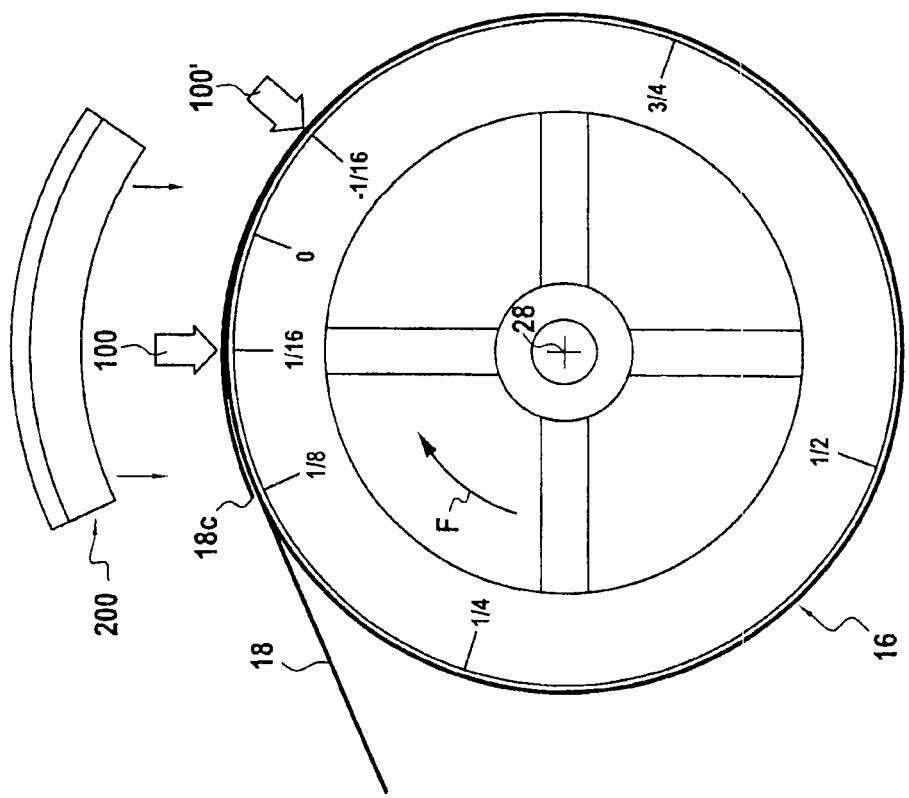
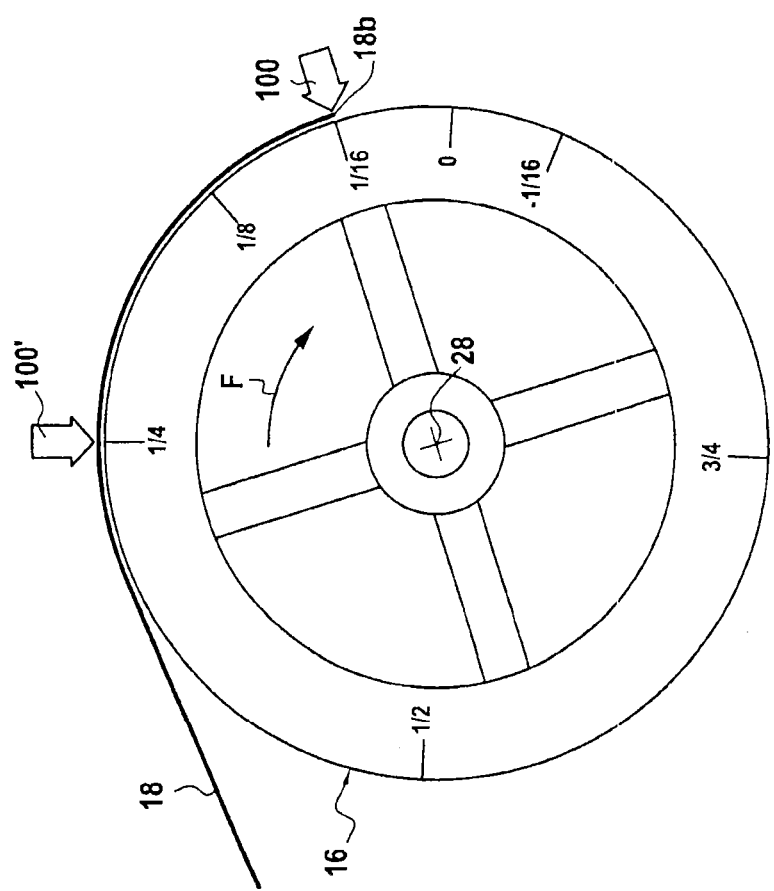
FIG.4B
FIG.4A

DEVICE FOR HOLDING A FIBER TEXTURE ON AN IMPREGNATION MANDREL OF A WINDING MACHINE

BACKGROUND OF THE INVENTION

The present invention relates to the general field of making case turbine casings out of composite material, and it relates more particularly to gas turbine fan retention casings for aeroengines.

In a gas turbine aeroengine, a fan casing performs several functions: it defines the passage for admitting air into the engine, it supports an abradable material in register with the tips of the fan blades, it supports an optional structure for absorbing soundwaves to perform acoustic treatment at the inlet to the engine, and it incorporates or supports a retention shield. The shield constitutes a trap for retaining debris that has been projected by centrifuging, e.g. such as items that have been ingested or fragments of damaged blades, for the purpose of preventing them from passing through the casing and reaching other parts of the aircraft.

It is common practice for a fan retention casing to be made up firstly of a relatively thin wall defining the air inlet passage and supporting an abradable material in register with the path followed by the tips of the fan blades, and also supporting the acoustic treatment coating, if any, and secondly of a shield structure that is fastened to said wall on the outside, around the fan.

Proposals have already been made for making a fan retention casing out of composite material. By way of example, reference may be made to Document EP 1 961 923, which describes fabricating a casing out of composite material of varying thickness, by forming fiber reinforcement out of superposed layers of a fiber texture and densifying the fiber reinforcement with a matrix. More precisely, that document makes provision for using a take-up mandrel during the three-dimensional weaving of the fiber texture, with the texture then being wound in superposed layers on an impregnation mandrel that present an outer surface of profile that corresponds to the profile of the central portion of the casing to be fabricated together with two cheekplates corresponding to fastener flanges of the casing. The fiber preform as obtained in this way is held on the impregnation mandrel and is impregnated with resin prior to polymerizing the resin.

A practical implementation of that method raises the problem of transferring the fiber texture from the take-up mandrel to the impregnation mandrel. To solve that problem, the Applicant has made proposals in French patent application FR 11/53212 (not yet published) for a winding machine that makes it possible while transferring the fiber texture from the take-up mandrel to the impregnation mandrel both to place the fiber texture correctly on the impregnation mandrel and to apply an appropriate winding tension.

With such a machine, there arises the problem of holding the fiber texture on the impregnation mandrel when starting winding. Since winding is performed directly onto the mandrel that is to be used when impregnating it with the resin, the mandrel is smooth and therefore does not present any attachment means on its surface. This problem of holding the fiber texture on the impregnation mandrel also arises at the end of winding where, prior to cutting the fiber preform to its final length, it is necessary to hold the fiber preform while not losing the tension that was applied to the texture while it was being wound.

Consequently, there exists a need for tooling that makes it possible to hold the fiber texture on the impregnation mandrel at the beginning of winding and at the end of winding.

OBJECT AND SUMMARY OF THE INVENTION

A main object of the present invention is thus to mitigate such a requirement by proposing a device for holding a fiber texture on an impregnation mandrel of a winding machine, the device comprising:

a cross-member forming a support having each of its ends for fastening on one of the cheekplates of the mandrel;

a central pad carrier mounted on the cross-member and provided with a pad for pressing against a fiber texture layer wound on the mandrel;

two lateral pad carriers mounted on the cross-member and each provided with a main pad for pressing against the fiber texture layer wound on the mandrel and a lateral pad for pressing against a lateral margin of the fiber texture layer wound on the mandrel; and means for exerting a clamping force urging the pads against the fiber texture layer wound on the mandrel.

The device of the invention is remarkable in that it makes it possible to hold the fiber texture that is being wound on the impregnation mandrel of a winding machine by clamping (or pinching) it. The device thus serves to hold the fiber preform on the impregnation mandrel at the beginning of winding, and also at the end of winding while maintaining sufficient winding tension in the fiber texture.

Furthermore, the presence of the central pad and of the two lateral pads makes it possible to apply a clamping force against the fiber texture not only across its entire width, but also in its corners (which correspond to the flanges of the casing).

Finally, the device of the invention presents the advantage of being capable of being fastened to the cheekplates of the impregnation mandrel, thereby making it easily removable.

Preferably, the device further comprises a pressure distribution plate for interposing between the pads and the fiber texture layer wound on the mandrel. The presence of this plate makes it possible to distribute the clamping force exerted by the pads across the entire width of the fiber texture layer.

Advantageously, this pressure distribution plate has flexible zones so as to enable it to fit closely to the profile of the outer surface of the mandrel. For example, the pressure distribution plate may be made of a plastics material and the flexible zones may present grooves formed in the thickness of the plate.

Each pad may be fastened to the pad carrier by a screw-and-nut system that can be actuated by a clamping handle so as to exert a force for clamping said pad against the fiber texture layer wound on the mandrel.

The invention also provides a machine for winding a fiber texture onto an impregnation mandrel, the machine comprising a take-up mandrel for storing a fiber texture obtained by three-dimensional weaving, the take-up mandrel having a substantially horizontal axis of rotation, an impregnation mandrel onto which the fiber texture stored on the take-up mandrel is to be wound in superposed layers, the impregnation mandrel having an axis of rotation that is substantially horizontal and parallel to the axis of rotation of the take-up mandrel, electric motors for driving the mandrels in rotation about their respective axes of rotation, a control unit for controlling the electric motors for driving rotation of the mandrels, and at least one holder device as defined above for holding the fiber texture on the impregnation mandrel.

Preferably, the winding machine including two holder devices for holding the fiber texture on the impregnation mandrel, said devices being angularly spaced apart from each other about the axis of rotation of the impregnation mandrel.

BRIEF DESCRIPTION OF THE DRAWINGS

Other characteristics and advantages of the present invention appear from the description made below with reference to the accompanying drawings, which show an embodiment having no limiting character. In the figures:

FIGS. 4A and 4B are diagrammatic view of the impregnation mandrel of the FIG. 1 winding machine showing possible locations for the holder device of the invention.

DETAILED DESCRIPTION OF AN EMBODIMENT

The invention is described below in the context of its application to fabricating a fan casing for a gas turbine aeroengine.

An example of a method of fabricating such a fan casing is described in document EP 1 961 923, to which reference may be made.

The casing is made of a composite material comprising fiber reinforcement densified by a matrix. By way of example, the fiber reinforcement is made of carbon, glass, aramid, or ceramic fibers, and the matrix is made of a polymer, e.g. an epoxy, a bismaleimide, or a polyimide resin.

Briefly, the method of fabrication described in that document consists in making a fiber texture by three-dimensional weaving with warp take-up onto a drum (referred to below as a take-up mandrel) having a profile that is determined as a function of the profile of the casing to be fabricated.

The fiber texture as made in this way is subsequently transferred onto the mandrel of a resin injection mold (referred to below as the impregnation mandrel) of outside profile corresponding to the inside profile of the casing to be fabricated.

With the preform held on the impregnation mandrel, impregnation is then performed using a resin. For this purpose, an envelope is applied to the preform and the resin is injected into the mold as constituted in this way. Impregnation may be assisted by establishing a pressure difference between the inside and the outside of the mold containing the preform. After impregnation, a resin polymerization step is performed.

Figure 1:
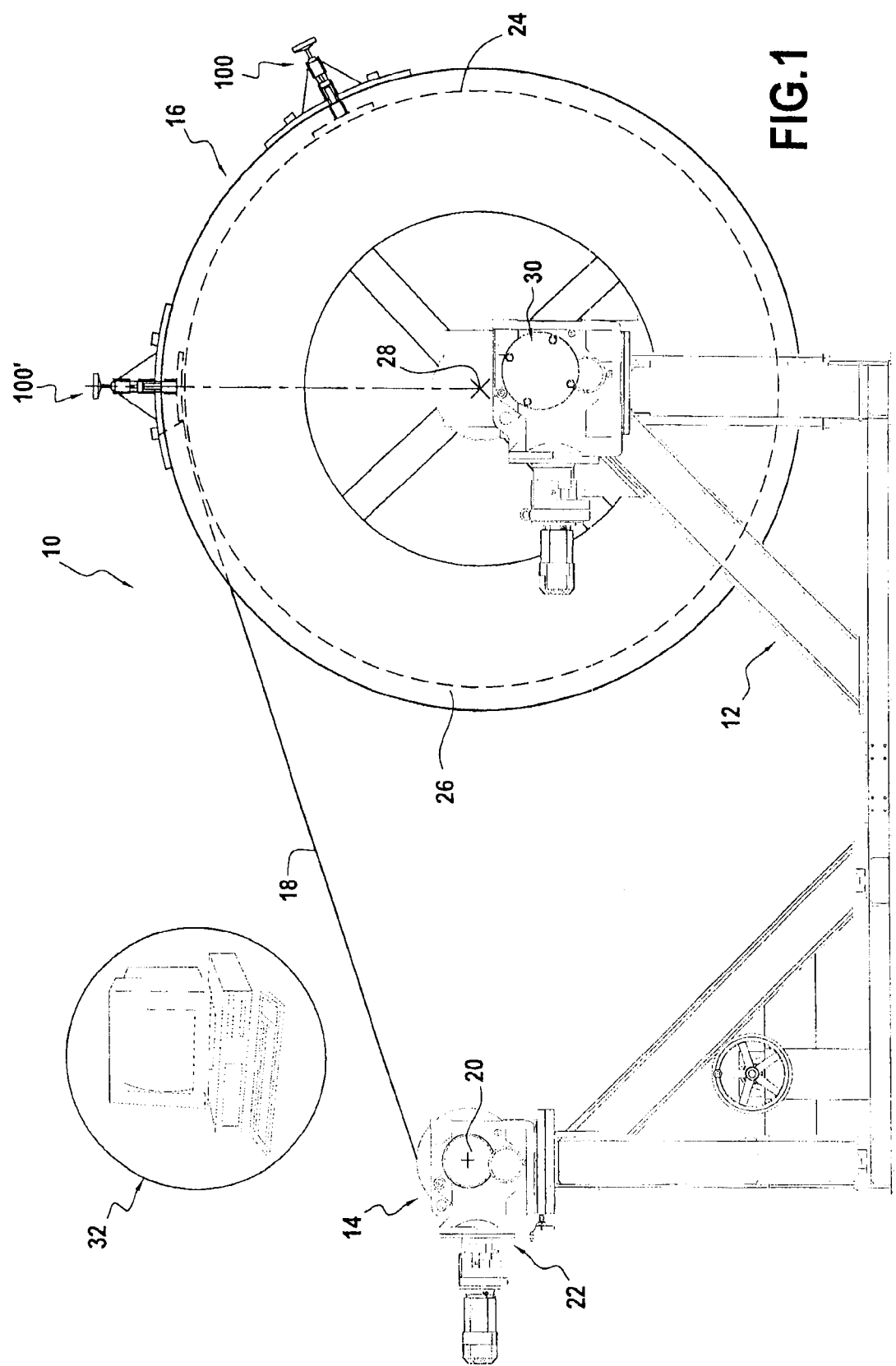
FIG. 1 is a side view of a machine for winding a fiber texture onto an impregnation mandrel and including a holder device of the invention.

The invention applies to any type of winding machine having the function of enabling the fiber texture stored on the take-up mandrel to be transferred automatically to the impregnation mandrel of the resin injection mold, as shown in FIG. 1.

Reference may be made to patent application FR 11/53212 (not yet published), which describes the structure and the operation of such a machine in detail.

Briefly, the winding machine 10 comprises a support structure 12 serving to support in particular a take-up mandrel 14 and an impregnation mandrel 16. These mandrels are removable, i.e. they may be separated from the support structure.

The take-up mandrel 14 receives the fiber texture 18, e.g. obtained by three-dimensional weaving. It is carried by a horizontal shaft of axis 20 having one end rotatably mounted on the support structure 12 of the winding machine and having its other end coupled to the outlet shaft of an electric motor 22, e.g. an alternating current (AC) electric gear motor.

The assembly constituted by the take-up mandrel 14, its shaft of axis 20, and its electric motor 22 can move in translation relative to the support structure along the axis of rotation of the take-up mandrel. This degree of freedom for the take-up mandrel to move in translation makes it possible to bring this mandrel into alignment with the impregnation mandrel prior to winding the fiber texture onto the impregnation mandrel.

The impregnation mandrel 16 of the winding machine is for receiving superposed layers of the fiber texture stored on the take-up mandrel. It presents an outside surface 24 of profile that corresponding to that of the inside surface of the casing that is to be made, and two cheekplates 26 of profile corresponding to the profiles of the outer flanges of the casing at its upstream and downstream ends in order to enable the casing to be mounted in association with other elements.

The impregnation mandrel is carried by a horizontal shaft of axis 28 that is parallel to the axis of rotation 20 of the take-up mandrel and that has one end rotatably mounted on the support structure 12 of the winding machine and its other end coupled to the outlet shaft of an electric motor 30, e.g. an AC electric gear motor.

A control unit 32 is connected to the electric motors 22 and 30 of the two mandrels and serves to control and monitor the speed of rotation of each mandrel. In more generally manner, this control unit serves to govern all of the operating parameters of the winding machine, and in particular the movement in translation of the take-up mandrel when that movement is motor-driven.

With such a machine, the fiber texture is wound onto the impregnation mandrel as follows: the free end of the fiber texture on the take-up mandrel is initially fastened on the impregnation mandrel by means of one or more holder devices as described below, and then the motors for driving the mandrels in rotation are activated under the control of the control unit so as to apply an appropriate winding tension on the fiber texture.

In FIG. 1, the winding machine 10 has two holder devices 100 and 100' positioned at different angular positions on the impregnation mandrel at the start of winding. Naturally, a single device may suffice.

Figure 2:
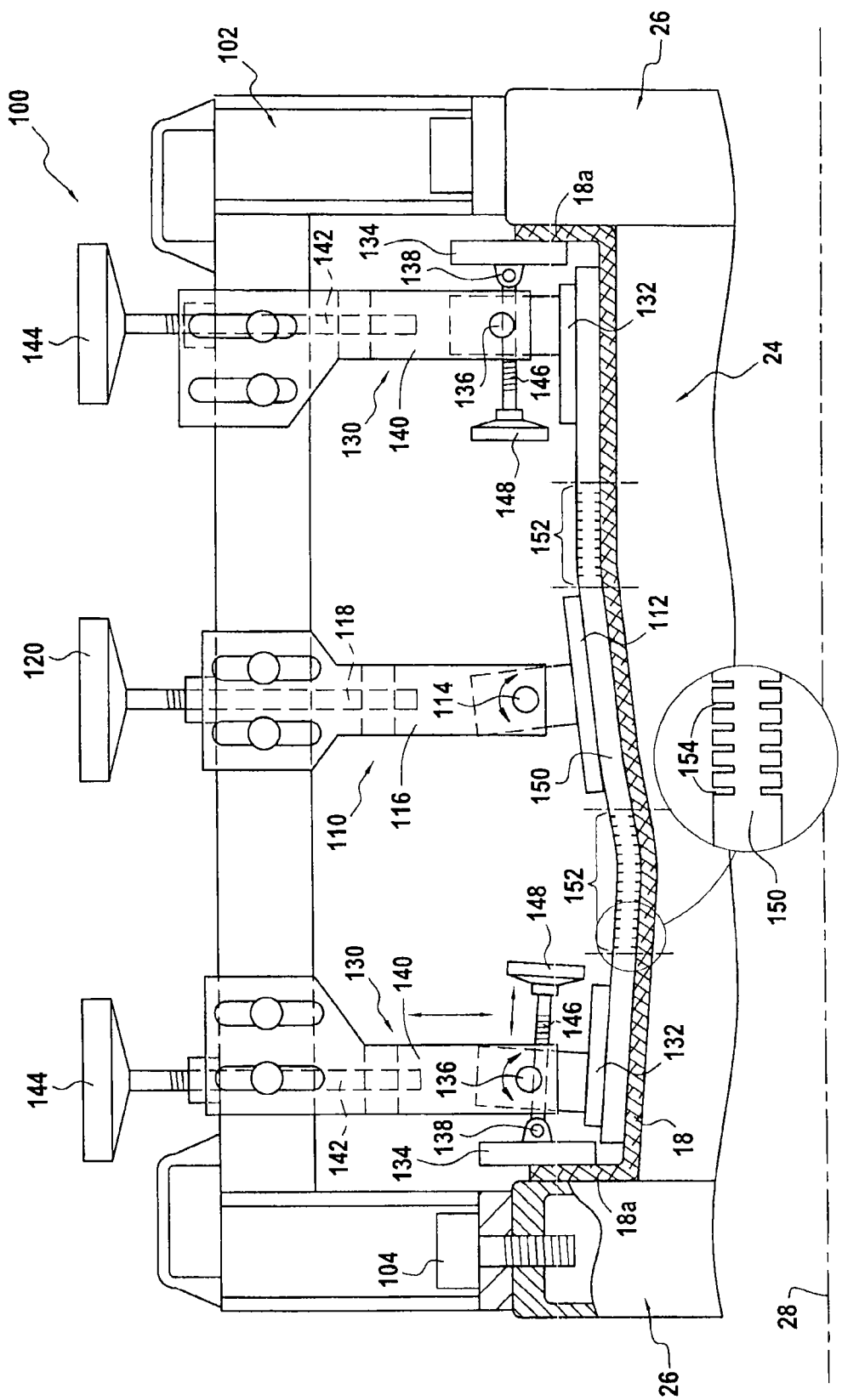
FIGS. 2 and 3 are views of the FIG. 1 holder device.
Figure 3:
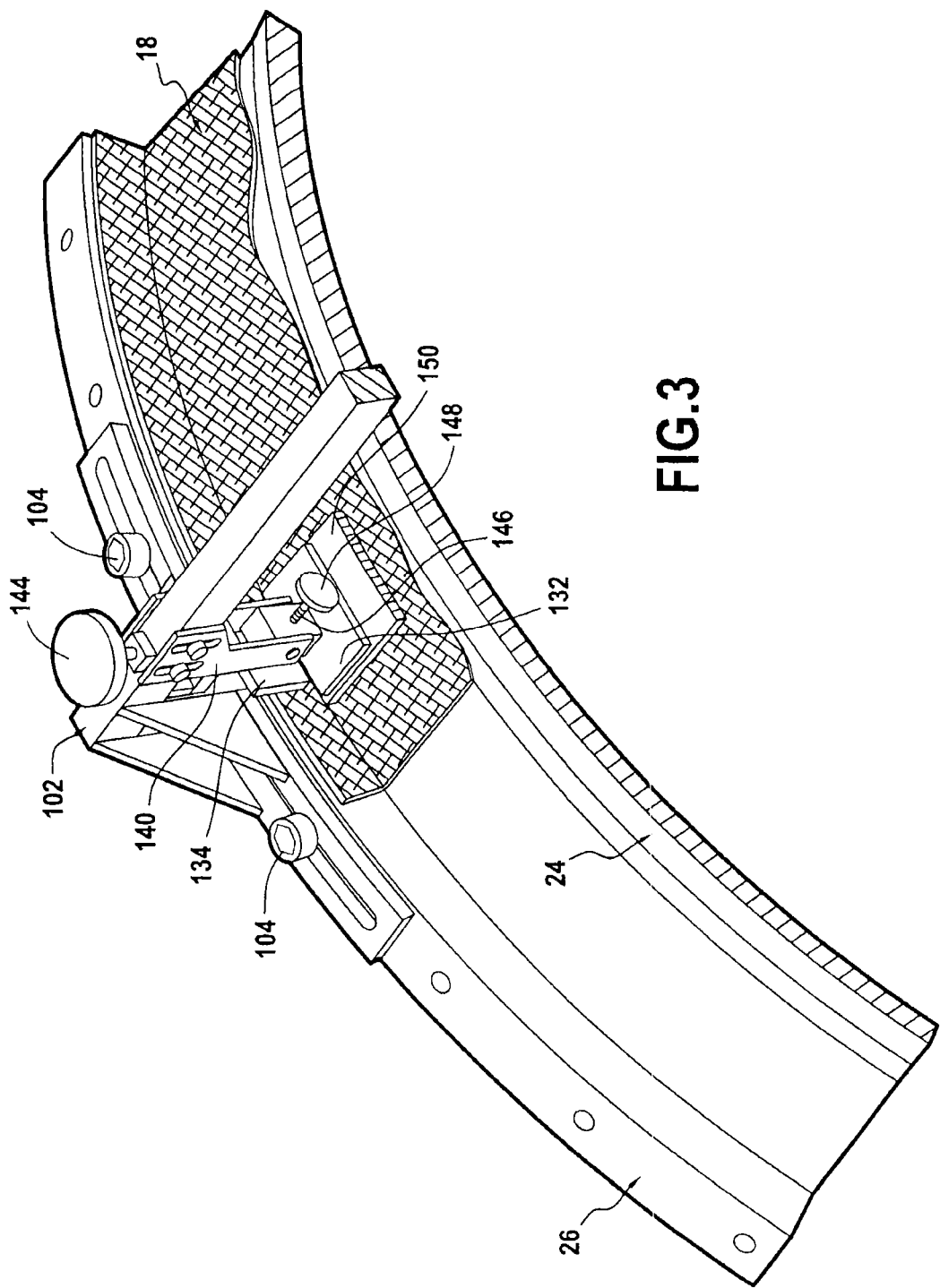

The holder device 100 of the invention is shown in greater detail in FIGS. 2 and 3. It serves to hold the free end of the fiber texture on the impregnation mandrel when starting winding. At the end of winding, it is also used for holding the fiber texture on the impregnation mandrel before the texture is cut to its final length.

The holder device 100 comprises in particular a cross-member 102 forming a support having its two ends fastened, e.g. by means of screws 104, to the cheekplates 26 of the impregnation mandrel. The holder device is thus made removable.

The cross-member 102 supports three pad carriers; namely a central pad carrier 110 and two lateral pad carriers 130.

The central pad carrier 110 is positioned more particularly at substantially equal distances from the two cheekplates 26 of the impregnation mandrel. It has a pad 112 mounted via a pivot connection 114 to a pad support 116 that is itself fastened to the cross-member. The pad is for pressing against the layer of fiber texture 18 wound on the impregnation mandrel.

The central pad carrier 110 also has a screw-and-nut system made up of a wormscrew 118 that can be actuated by means of a clamping handle 120 and that is secured to the pad support 116. By turning the handle 120, it is thus possible to lower or raise the pad 112 relative to the cross-member, and thus to press the pad to a greater or lesser extent against the fiber texture layer.

The lateral pad carriers 130 are located at the corners formed between the outside surface 24 of the impregnation mandrel and the cheekplates 26.

Each lateral pad carrier has a main pad 132 for pressing against the fiber texture layer 18 wound on the impregnation mandrel, and a lateral pad 134 for pressing against a lateral margin 18a of the fiber texture layer 18. These two pads 132 and 134 are mounted via pivot connections given respective references 136 and 138 on a pad support 140 that is itself fastened to the cross-member 102.

Each lateral pad carrier also has a screw-and-nut system made up of a wormscrew 142 that can be actuated by a clamping handle 144 and that is secured to the pad support 140. By turning the handle 144, it is thus possible to lower or raise the main pad 132 relative to the cross-member, and thus to clamp the pad to a greater or lesser extent against the fiber texture layer.

The lateral pad 134 is also adjustable by means of a screw-and-nut system made up of a wormscrew 146 that can be actuated by a lateral clamping handle 148 and that is secured to the pad support 140. By turning this handle 148, it is thus possible to move the lateral pad 134 laterally relative to the cheekplate of the impregnation mandrel, and thus clamp the lateral pad to a greater or lesser extent against the lateral margin 18a of the fiber texture layer.

As shown in FIG. 2, a pressure distribution plate 150 is advantageously interposed between the pads 112, 132 and the fiber texture layer 18 wound on the impregnation mandrel. The presence of this plate makes it possible to distribute the clamping pressure exerted by the pads across the entire width of the fiber texture layer.

The plate 150 is made of plastics material, e.g. of polyamide or of polytetrafluoroethylene, and it presents thickness that is sufficient to ensure, as a result of its stiffness, that the clamping pressure is transmitted to zones of the fiber texture layer that are not covered by the pads 112, 132. By way of example, this thickness may be of the order of 10 millimeters (mm) approximately.

Furthermore, it is also appropriate to ensure that the plate has a certain amount of flexibility in zones where the profile of the outer surface of the impregnation mandrel is not linear so as to enable the plate to fit closely to the profile of the outer surface of the impregnation mandrel.

For this purpose, the pressure distribution plate 150 has defined flexible zones 152 between the pads 112, 132, these zones being made flexible, e.g. by forming grooves 154 in the thickness of the plate. By way of example, for a plate having a thickness of about 10 mm, these grooves may have a width of 1 mm and a depth of 3 mm. Furthermore, these grooves may be formed in one or both sides of the plate.

With Reference to FIGS. 4A and 4B, there follows a description of how two holder devices 100 and 100' in accordance with the invention can be positioned on the impregnation mandrel 16 of a winding machine during different stages in winding the fiber texture onto the mandrel.

In these figures, the direction of rotation of the mandrel 16 is represented by arrow F, and the fiber texture needs to be wound onto the mandrel over 4⅛ turns in order to obtain a casing preform of thickness in compliance with specifications.

FIG. 4A shows the configuration at the beginning of winding. Previously, the free end 18b of the fiber texture layer is positioned at the +1/16 mark on the mandrel 16, which is angularly situated at twelve o'clock. A first holder device 100 in accordance with the invention is then positioned of the mandrel at this same +1/16 mark and then the mandrel is turned in the direction of arrow F in order to bring it into the angular position shown in FIG. 4A. The second holder device 100' in accordance with the invention is then positioned on the mandrel at mark ¼. This configuration makes it possible to optimize the tensioning of the fiber texture in order to be able to begin winding. The winding of the fiber texture over a little more than four turns can then begin (naturally, the holder devices 100 and 100' are removed before the second turn).

Advantageously, in order to optimize the adhesion of the fiber texture layer on the mandrel, an adhesive may be deposited on the outer surface of the mandrel prior to depositing the free end of the fiber texture layer. For example, this adhesive may be constituted by epoxy resin (without a catalyst) and a solvent.

FIG. 4B shows the configuration at the end of winding. While the fiber preform is still under tension between the take-up mandrel (not shown) and the impregnation mandrel 16, first and second holder devices 100 and 100' in accordance with the invention are positioned on the mandrel, respectively at the 1/16 mark and at the −1/16 mark. The fiber texture can then be cut (at the ⅛ mark where reference 18c corresponds to the end of the winding of the fiber texture).

This configuration makes it possible to maintain the preform under tension by means of the second holder device 100' when it is necessary to remove the first holder device 100 in order to put into place the first angular sector 200 for closing the resin injection mold onto the impregnation mandrel. Once this angular sector has been put into place on the mandrel, the second holder device 100' is removed and the other angular sectors for closing the mold can be put into place in turn.

The invention claimed is:

1. A device for holding a fiber texture on an impregnation mandrel of a winding machine, the device comprising:
  a cross-member forming a support having each of its ends for fastening on one of cheekplates of the mandrel;
  a central pad carrier mounted on the cross-member and including a central pad for pressing against a fiber texture layer wound on the mandrel, the central pad being mounted to a central pad support via a first pivot connection, and a first screw-and-nut system including a first screw secured to the central pad support, the first screw being actuated by a first clamping handle so as to raise and lower the central pad relative to the cross-member so as to provide a clamping force of the central pad against the fiber texture layer wound on the mandrel; and
  first and second lateral pad carriers mounted on the cross-member, each of the first and second lateral pad carriers including:
    a plate-shaped main pad for pressing against the fiber texture layer wound on the mandrel, the main pad being mounted to a pad support via a second pivot connection and a second screw-and-nut system including a second screw secured to the pad support, the second screw being actuated by a second clamping handle so as to raise and lower the main pad relative to the cross-member so as to provide a clamping force of the main pad against the fiber texture layer wound on the mandrel; and a lateral pad for pressing against a lateral margin of the fiber texture layer wound on the mandrel, the lateral pad being mounted to the pad support via a third pivot connection and a third screw-and-nut system including a third screw secured to the pad support, the third screw being actuated by a third clamping handle so as to move the lateral pad laterally relative to one of the cheekplates of the mandrel so as to provide a clamping force of the lateral pad against the lateral margin of the fiber texture layer wound on the mandrel.

2. A device according to claim 1, further comprising a pressure distribution plate for interposing between said pads and the fiber texture layer wound on the mandrel.

3. A device according to claim 2, wherein the pressure distribution plate includes flexible zones to enable the pressure distribution plate to fit closely to a profile of an outer surface of the mandrel.

4. A device according to claim 3, wherein the pressure distribution plate is made of a plastics material and the flexible zones include grooves formed in a thickness of the pressure distribution plate.

* * * * *